B. SHIRLEY.
Improvement in Transplanter.
No. 127,713.            Patented June 11, 1872.
Fig. 1.          Fig. 2.
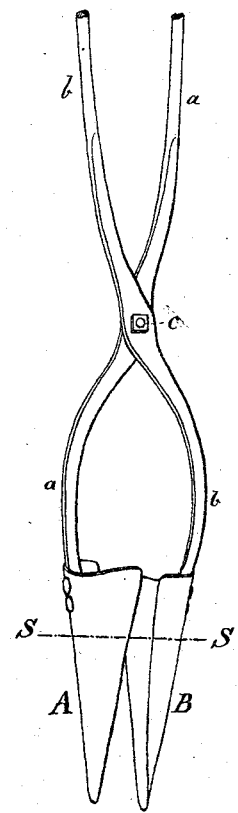
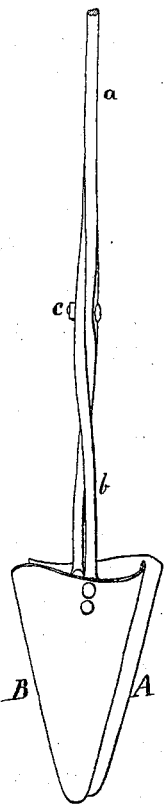
Fig. 3.
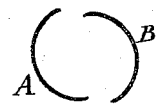
Fig. 4.
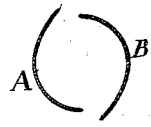
Witnesses:         Inventor:

127,713

UNITED STATES PATENT OFFICE.

BRADFORD SHIRLEY, OF KELLOGGSVILLE, NEW YORK.

IMPROVEMENT IN TRANSPLANTERS.

Specification forming part of Letters Patent No. 127,713, dated June 11, 1872.

Specification describing an Improved Planter and Transplanter, invented by BRADFORD SHIRLEY, of Kelloggsville, in Cayuga county, in the State of New York.

The device is more especially intended for planting trees while quite young, but may be made of various sizes, and used for planting small vegetables, or even for planting or transplanting trees and shrubs of more advanced growth.

It is formed of two curved blades, pivoted together by arms, and so formed and arranged that they stand in practically volute positions, so that by thrusting the device into the earth by pressing upon the upper edge of the blades with the foot or otherwise, a tapering cavity will be made; and, by turning it a quarter turn, more or less, the earth will be drawn in by reason of the volute or spiral position of the blades, and caused to nicely surround the plant previously introduced between the blades.

The following is a description of what I consider the best means of carrying out the invention.

The accompanying drawing forms a part of this specification.

Figure 1 is a side elevation of the lower portion of the device. Fig. 2 is an elevation at right angles to Fig. 1. Fig. 3 is a horizontal section, showing the blades uniformly curved and properly placed; while Fig. 4 is a corresponding section, showing what I consider the preferable form of the blades. It will be perceived in Fig. 4 that the blades are nearly flat at or near the edges which draw in the earth.

Similar letters of reference indicate corresponding parts in all the figures.

The blades A B being formed, as represented, of thin steel or other thin material, and strongly riveted to the arms $a$ $b$ pivoted together at the point $c$, and provided with suitable handles above—not represented—the operator presses the planter with a quick motion into the earth, which carries the contained plant, undisturbed, down as deep as it is designed to be set, and then gives about a quarter turn to the right or "with the sun," and, withdrawing the device, the plant is left nicely set.

It requires two persons—men or boys—to work the device expeditiously and easily; one to drop the plants into the planter, and the other to set them. In such case the operator takes one handle in each hand and lifts the device from the ground with the blades shut together. Then the assistant drops in a plant, and the other proceeds to thrust it in the ground and set it, as above described.

It will thus be perceived that there are three motions required to set a plant: First, down; second, a quarter turn, more or less, which opens the device; and, third, up.

One size of the device will set all kinds of plants that a gardener or farmer ordinarily cultivates, but I propose to make four sizes: One for general garden use, eleven inches long, and four and three-fourths inches across the top the largest way. (When closed together the device is of less dimensions in the other direction, measuring, in the smallest way, about three and three-fourths inches across the top.) Another, for tobacco culture, with the blades only three inches long and more flaring. A third, for various short rooted plants; and a fourth, for nursery plants, eleven inches long, and only two and one-half inches across the top.

The work may be done by two men or a man and a boy without the stooping or bending of either party.

I believe that both blades evenly curved, as shown in Fig. 3, may perform with some success, but I prefer the construction shown in Fig. 4, where the curved portion of each is nearly a part of a true hollow cone, to which is added a part which is nearly plane. The effect which I have described above as due to the volute position is really, in this form, Fig. 4, produced by the tangential position of the nearly flat portion. With either form the important function is attained of loosening and drawing inward the surrounding earth so as to set the plant upright in loosely stirred and properly pulverized earth.

A little practice allows the device to be operated with great rapidity and ease.

I can use the device successfully to take up and move plants with the earth attached, but I am not aware that it is better than other and previously known forms for that purpose. The benefit due to its peculiar form is only found in the setting of the plant. This is, to some extent, availed of whether the plant is dropped in loosely—as in the case of a root or scion in nursery work, where it simply resembles a straight stick about seven inches long—or is taken up with so much accompanying earth as to completely fill the closed device.

I claim as my invention—

The within-described planting and transplanting device, having the blades A B formed with a portion curved and another portion tangential, mounted in a volute or spiral position, and adapted to draw the earth together by a partial turning motion, as herein specified.

In testimony whereof I have hereunto set my name in presence of two subscribing witnesses.

BRADFORD SHIRLEY.

Witnesses:
E. S. PAYNE,
F. A. PASTELLO.